(12) United States Patent
Kawai et al.

(10) Patent No.: US 7,651,272 B2
(45) Date of Patent: Jan. 26, 2010

(54) METHOD OF ASSEMBLING AIR BEARING, AIR BEARING AND LINEAR DRIVE UNIT EQUIPPED WITH THE SAME

(75) Inventors: Tomohiko Kawai, Yamanashi (JP); Kenzo Ebihara, Yamanashi (JP); Hiroshi Minami, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 394 days.

(21) Appl. No.: 11/619,503

(22) Filed: Jan. 3, 2007

(65) Prior Publication Data

US 2007/0154120 A1    Jul. 5, 2007

(30) Foreign Application Priority Data

Jan. 4, 2006    (JP)    ............................... 2006-000112

(51) Int. Cl.
F16C 32/06    (2006.01)
H02K 7/08    (2006.01)

(52) U.S. Cl. ............................... 384/12; 384/15; 310/90

(58) Field of Classification Search ............. 384/12–15; 310/54, 58, 93, 103, 181, 12, 90, 90.5
See application file for complete search history.

(56) References Cited

U.S. PATENT DOCUMENTS

| | | | |
|---|---|---|---|
| 5,650,679 A * | 7/1997 | Boggs et al. ................. | 310/105 |
| 5,821,658 A * | 10/1998 | Boggs, III .................... | 310/105 |
| 6,623,251 B2 * | 9/2003 | Nawamoto et al. ........... | 417/290 |
| 6,730,916 B1 * | 5/2004 | Tsuji et al. ..................... | 310/13 |
| 2005/0057102 A1 * | 3/2005 | Totsu et al. ................... | 310/12 |

FOREIGN PATENT DOCUMENTS

| | | | |
|---|---|---|---|
| EP | 1469277 A2 | * | 10/2004 |
| JP | 60043723 U | | 3/1985 |
| JP | 61025742 A | * | 2/1986 |
| JP | 61209838 A | * | 9/1986 |

(Continued)

OTHER PUBLICATIONS

Notice of Reasons for Rejection of Patent Application No. 2006-000112 mailed Aug. 28, 2007.

*Primary Examiner*—Marcus Charles
(74) *Attorney, Agent, or Firm*—Lowe Hauptman Ham & Berner, LLP (57) ABSTRACT

A method of assembling an air bearing, the air bearing having a guide on a fixed side, and a slider having a pair of opposing members arranged on opposite sides of the guide, the slider being float-supported so as to be able to move relative to the guide, the method having: contacting a first opposing member of the pair of opposing members to the guide; supplying compressed air of a predetermined pressure between the first opposing member and the guide contacting each other, so as to form a temporary gap twice as large as a target bearing gap between the first opposing member and the guide; maintaining contact between the guide and a second opposing member of the pair of opposing members; and supplying compressed air of a predetermined pressure between the first opposing member and the guide as well as the second opposing member and the guide, so as to form respective target bearing gaps between first and second opposing members and the guide, in place of the temporary gap.

5 Claims, 8 Drawing Sheets

FOREIGN PATENT DOCUMENTS

| | | | |
|---|---|---|---|
| JP | 62035112 A | | 2/1987 |
| JP | 62035113 A | | 2/1987 |
| JP | 62037514 A | | 2/1987 |
| JP | 63231019 A | | 9/1988 |
| JP | 01288615 A | | 11/1989 |
| JP | 02015837 A | | 1/1990 |
| JP | 04145219 A | * | 5/1992 |
| JP | 04236303 A | * | 8/1992 |
| JP | 05109812 A | * | 4/1993 |
| JP | 06264923 A | * | 9/1994 |
| JP | 06341435 A | | 12/1994 |
| JP | 8-28565 A | | 2/1996 |
| JP | 08323567 A | * | 12/1996 |
| JP | 10026139 A | | 1/1998 |
| JP | 10246228 A | | 9/1998 |
| JP | 10288225 A | * | 10/1998 |
| WO | WO 9000722 A1 | * | 1/1990 |

* cited by examiner

METHOD OF ASSEMBLING AIR BEARING, AIR BEARING AND LINEAR DRIVE UNIT EQUIPPED WITH THE SAME

RELATED APPLICATION

The present application is based on, and claims priority from, Japanese Application Number 2006-000112, filed Jan. 4, 2006, the disclosure of which is incorporated, by reference, in its entirety.

BACKGROUND OF THE INVENTION

1. Field of the Invention

The present invention relates to a method of assembling an air bearing which is applied to a machine tool and to measuring equipment, and float-supports a slider, on the moving side, so as to be able to move relative to a guide on the fixed side, and relates also to the air bearing and to a linear drive unit equipped with the same.

2. Description of the Related Art

Figure 8:
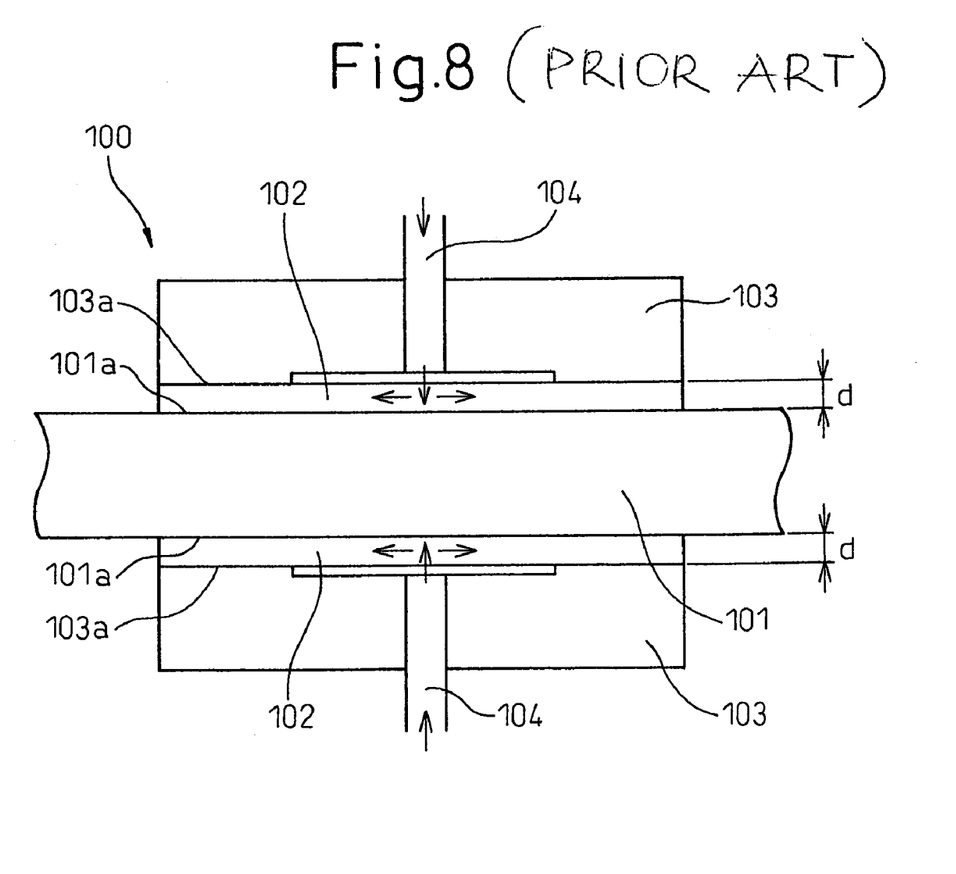
FIG. 8 is a sectional view illustrating a conventional air bearing.

Conventionally, an air bearing equipped with a slider float-supported so as to be able to move relative to a guide, disclosed Japanese Unexamined Patent Publications 08-28565 (JP-A-08-28565), is shown in FIG. 8. The air bearing 100, that is shown in FIG. 8, includes a guide 101 formed bearing surfaces 101a on two opposing surfaces thereof, and a slider 103 that has opposing surfaces 103a opposed to the bearing surfaces 101a via bearing gaps 102 and is float-supported by the guide 103 so as to be able to linearly move.

The slider 103 has flow paths 104 for supplying pressurized gas (compressed air) to the bearing gaps 102. Upon supplying the pressurized gas into the bearing gaps 102 through the flow paths 104, the slider 103 is float-supported. The size d of the bearing gaps 102 formed over and under the guide 101 is selected to be several microns to several tens of microns. Therefore, the guide 101 and the slider 103 are out of contact with each other, and the slider 103 is able to move smoothly.

If a bearing gap of an air bearing becomes too large, a problem arises in that the rigidity of bearing decreases and vibration is generated. If a bearing gap becomes too small, on the other hand, another problem arises in that the guide comes in contact with the slider and this makes it difficult to accomplish precise positioning, though the rigidity increases. Therefore, the air bearings are generally so assembled that a bearing gap between the guide and the slider becomes about several microns by using a precision instrument such as a precision shim and a dial gauge. However, it is very difficult to assemble the guide and the slider in such manner that the bearing gap becomes several microns, as much experience and skill are required, through trial and error, in performing the work and assembly. Therefore, the working efficiency is not good. Besides, long periods of time were required for assembling, causing an increase in the cost of production.

SUMMARY OF THE INVENTION

In view of the above-mentioned respects, it is an object of the present invention to provide a method of assembling an air bearing which makes it possible to easily set a designed target bearing gap between the guide and the slider, and improves the assembling operation, and to provide the air bearing and a linear drive unit equipped with the same.

In order to achieve the above object, the present invention provides a method of assembling an air bearing, the air bearing comprising a guide on a fixed side, and a slider having a pair of opposing members arranged on opposite sides of the guide, the slider being float-supported so as to be able to move relative to the guide, the method comprising: contacting a first opposing member of the pair of opposing members to the guide; supplying compressed air of a predetermined pressure between the first opposing member and the guide contacting each other, so as to form a temporary gap twice as large as a target bearing gap between the first opposing member and the guide; maintaining contact between the guide and a second opposing member of the pair of opposing members; and supplying compressed air of a predetermined pressure between the first opposing member and the guide as well as the second opposing member and the guide, so as to form respective target bearing gaps between first and second opposing members and the guide, in place of the temporary gap.

Further, the present invention provides an air bearing comprising: a guide on a fixed side; and a slider having a pair of opposing members arranged on opposite sides of the guide, the slider being float-supported so as to be able to move relative to the guide: wherein the guide and the slider are assembled together by the method according to above-described method.

According to these inventions as described above, it is possible to easily set a designed target bearing gap between the guide and the slider, and to improve the assembling operation.

BRIEF DESCRIPTION OF THE DRAWINGS

These and other objects and features of the present invention will become clearer from the following description of the preferred embodiments with reference to the attached drawings, wherein.

DETAILED DESCRIPTION

A first embodiment of the air bearing according to the present invention will now be described with reference to FIG. 1. The air bearing of this embodiment is constituted by a base that is not shown, a guide 2 fixed to the base, a slider 12 on the moving side float-supported so as to be able to move relative to the guide 2, and air-supplying means for supplying compressed air into between the opposing surfaces of the guide 2 and of the slider 12.

The guide 2 extends straight to guide the slider 12, and is fixed to the base of a machine tool or measuring equipment that is not shown. The guide 2 is of a right-and-left symmetrical shape, and has bearing surfaces (two pairs of opposing surfaces) 3 to 6 on the upper and lower surfaces and on the right and left side surfaces. The upper bearing surfaces 5 are arranged on both sides of a groove 9, and the right and left bearing surfaces 3 and 4 are arranged on both sides of recessed portions 7.

Figure 2:
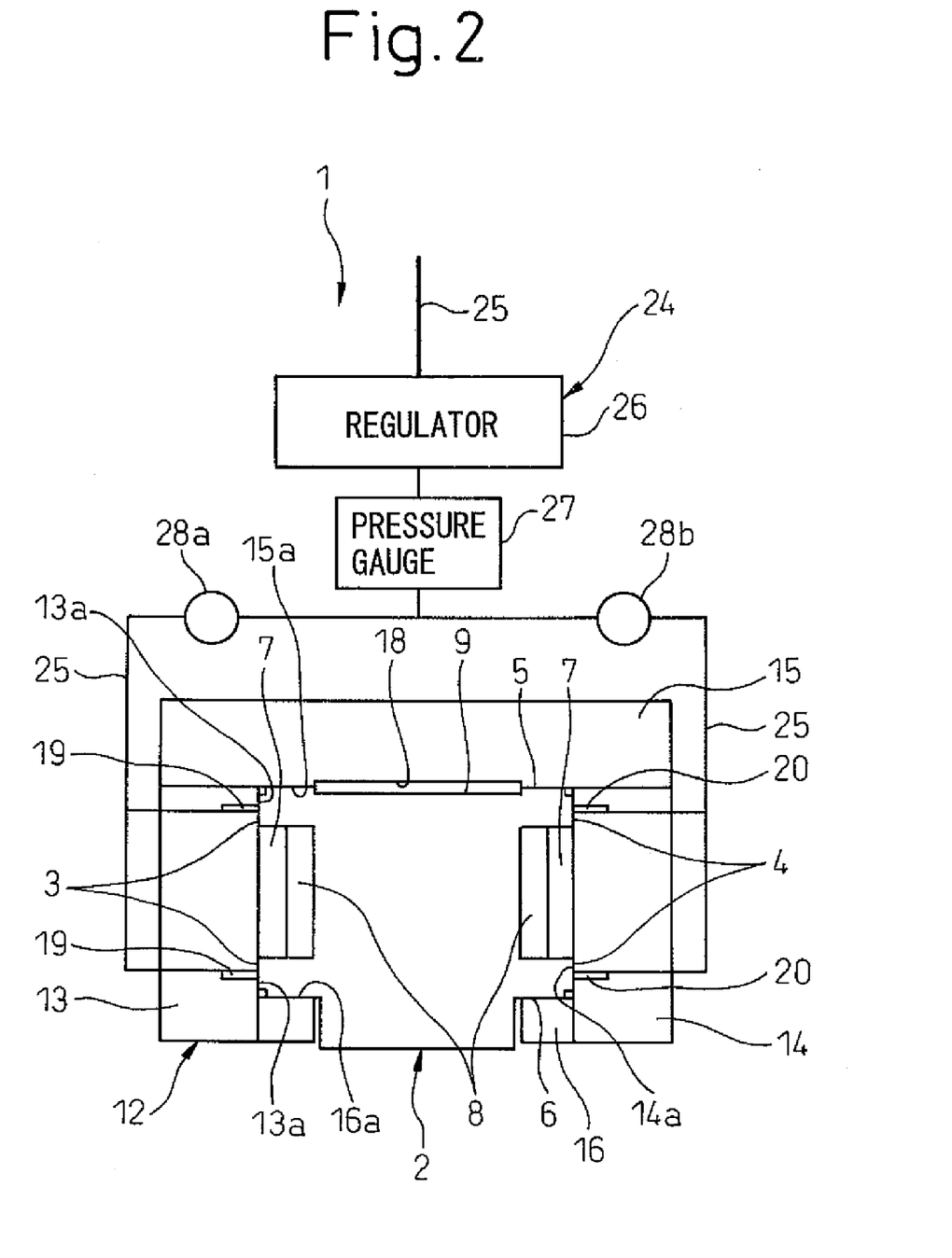
FIG. 2 is a sectional view illustrating a method of assembling the air bearing shown in FIG. 1, and shows a state where compressed air is shut off by a regulator.

Referring to FIG. 2, magnets 8 are provided in the right and left recessed portions 7 for bringing the bearing surfaces 3 and 4 of the guide 2 into close contact with the opposing surfaces 13a and 14a of the slider 12. The magnets 8 are for bringing the bearing surfaces 3, 4 of the guide into close contact with the opposing surfaces 13a, 14a of the slider 12 with a weak magnetic force in a step prior to adjusting bearing gaps 10 (FIGS. 3 and 4) of the air bearing. The bearing surfaces 3, 4 are brought into close contact with the opposing surfaces 13a, 14a on both the right and left sides of the guide 2 to easily adjust the bearing gaps 10 as will be described later.

The bearing surface 5 formed on the upper side of the guide 2 comes into sliding contact with the opposing surfaces 15a of the upper opposing member 15 of the slider 12. Grooves 9 and 18 are formed in intermediate portions between the bearing surfaces 5 and the opposing surfaces 15a to thereby form a non-contacting portion (see FIG. 2). Therefore, the bearing surfaces 5 and the opposing surfaces 15a come in contact at their both end portions while maintaining a good balance. The bearing surface 6 formed on the lower side of the guide 2 come into sliding contact with the opposing surface 16a of the lower opposing members 16 of the slider 12. Thus, the upper and lower bearing surfaces 5 and 6 of the guide 2 come into sliding contact with the upper and lower opposing surfaces 15a and 16a of the slider 12 to enhance rigidity of the air bearing in the up-and-down direction.

Figure 1:
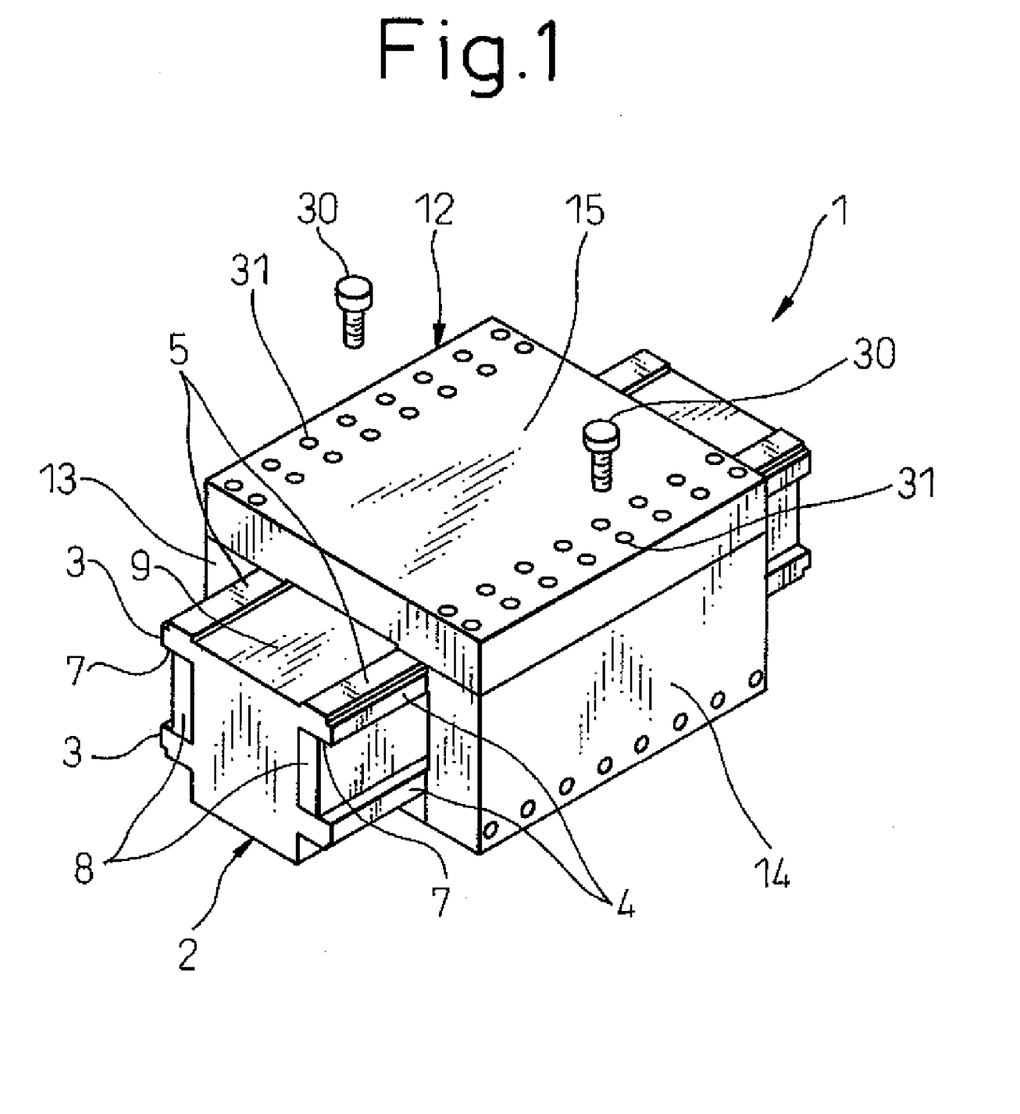
FIG. 1 is a perspective view illustrating a first embodiment of an air bearing according to the present invention.

The slider 12 has two pairs of opposing members 13 to 16 arranged being opposed to each other in two directions of the guide 2 at right angles with each other, i.e., in the up-and-down direction and in the right-and-left direction, the opposing members 13 to 16 being assembled like a frame by using a plurality of bolts 30 (FIG. 1). Depending upon the degree of fastening the bolts 30, the opposing members 13 and 14 in the right-and-left direction can be assembled assuming two states, i.e., a state where they are tentatively fixed to the opposing members 15 and 16 arranged in the upper-and-lower direction and a state where they are firmly fixed.

That is, by loosely fastening the bolts 30 in a manner that there is a play between the bolts 30 and the holes 31, the opposing members 13 and 14 in the right-and-left direction are tentatively fixed to the opposing members 15 and 16 in the up-and-down direction. By tightly fastening the bolts 30 so that there is no play between the bolts 30 and the holes 31, the opposing members 13 and 14 in the right-and-left direction are firmly fixed to the opposing members 15 and 16 in the up-and-down direction. In the tentatively fixed state, the opposing members 13 and 14 are allowed to move in the right-and-left direction by an amount of play between the externally threaded portions of the bolts 30 and the internally threaded portions of the holes 31. In the firmly fixed state, the positions of the opposing members 13 and 14 in the right-and-left direction are fixed to the opposing members 15 and 16 in the up-and-down direction.

In the state where the opposing members 13 and 14 are tentatively fixed as will be described below, a gap is adjusted between the bearing surfaces 3, 4 of the guide 2 and the opposing surfaces 13a, 14a of the opposing members 13, 14. In the state where the opposing members 13 and 14 are firmly fixed, the gap is fixed to a desired size, and the slider 12 is float-supported on both the right and left sides of the guide 2 so as to allow it to move relative thereto.

The pair of right and left opposing members 13, 14 have flow paths 19 and 20 formed penetrating therethrough to pass compressed air adjusted to a predetermined pressure by a regulator 26. The flow paths 19 and 20 are formed in the opposing members 13 and 14 penetrating therethrough into two places at positions to supply compressed air into between the bearing surfaces 3, 4 of the guide 2 and the opposing surfaces 13a, 14a of the opposing members 13, 14. Gaps exist between the guide 2 and the slide 12, and supplied compressed air leaks through the gaps. By taking the leakage into consideration, compressed air of the predetermined pressure is supplied through the flow paths 19 and 20 at all times.

The air-supplying means is constituted by a pipe 25 for supplying the air, the regulator 26 for adjusting the pressure of the supplied air, a pressure gauge 27 for measuring the air pressure, and two valves 28a and 28b for interrupting the supply of the air. The regulator 26 and the pressure gauge 27 are arranged in the pathway before compressed air is supplied to the slider 12, and it is allowed to supply the air to the slider 12 while making sure the pressure of compressed air that is supplied. The air flowing through the regulator 26 and the pressure gauge 27 is divided into two paths and is supplied through the valves 28a and 28b. Therefore, the air supplied to the right and left opposing members 13 and 14 can be limited (shut off) for its supply separately.

Next, a method of assembling an air bearing according to the embodiment will be described with reference to FIGS. 2 to 4. Referring to FIG. 2, the air bearing is so constituted that the slide 12 surrounds the guide 2. Both side surfaces of the guide 2 are the bearing surfaces 3 and 4 opposed to the slider 12. Compressed air has been shut off by the regulator 26. Of the pair of right and left opposing members 13 and 14, the opposing member 13 of the left side is firmly fixed to the upper and lower opposing members 15 and 16 which are the coupling members by using bolts 30 (FIG. 1), while the opposing member 14 of the right side is tentatively fixed to the upper and lower opposing members 15 and 16. That is, the opposing member 14 of the right side has the bolts 30 loosely tightened, and is allowed to move in the right-and-left direction by an amount corresponding to a play between the externally threaded portions of the bolts 30 and the internally threaded portions in the opposing members 15, 16.

In this state, one opposing member 13 is brought into close contact with the bearing surface 3 on the left side of the guide 2 due to the attractive force of the magnet 8 incorporated in the guide 2, and the other opposing member 14 is similarly brought into close contact with the bearing surface 4 on the right side due to the attractive force of the magnet 8.

Figure 3:
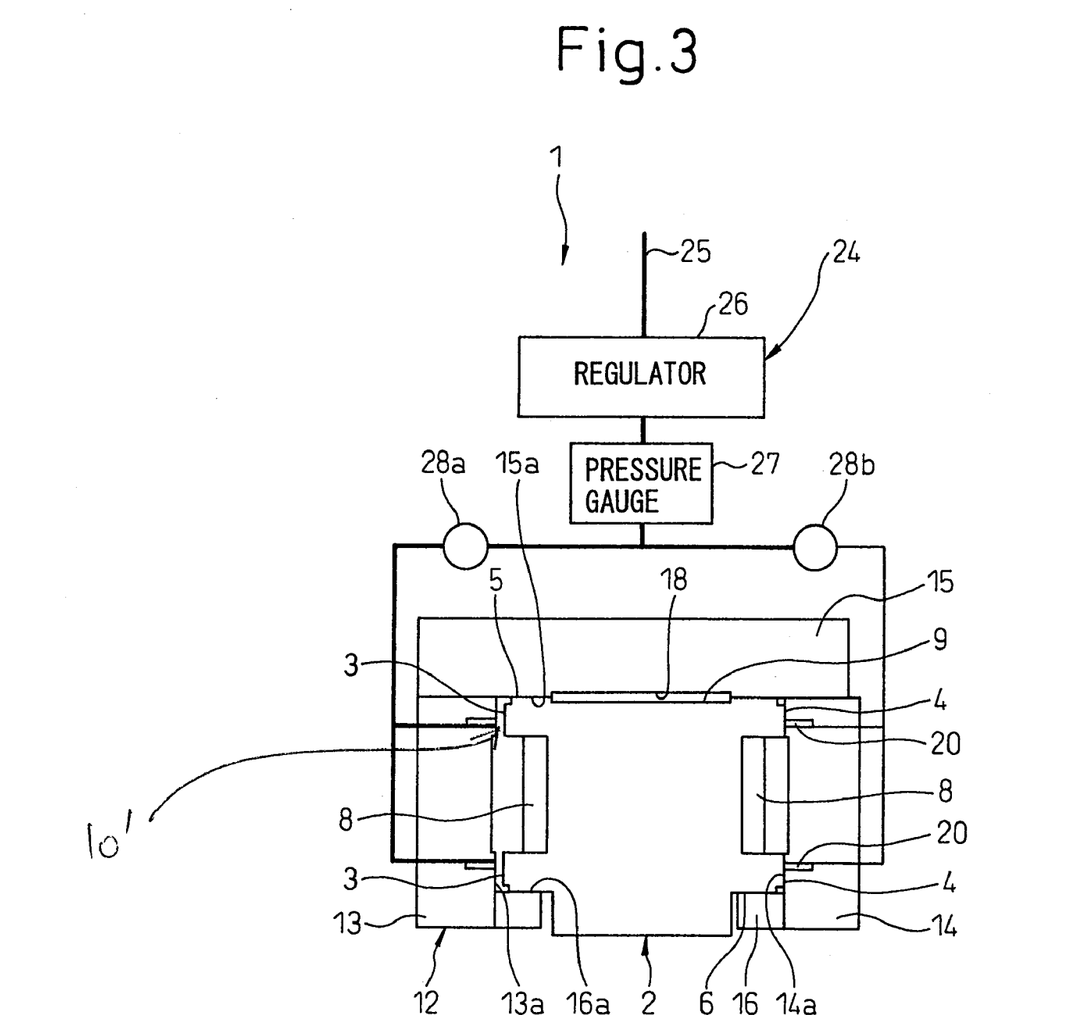
FIG. 3 is a sectional view similarly illustrating the method of assembling the air bearing, and shows a state where one valve is opened and the other valve is closed.

Referring to FIG. 3, if compressed air of the predetermined pressure is supplied through the flow path 19 in one opposing member 13, the pressure of compressed air works against the attractive force of the magnet 8 and the opposing surface 13a of the one opposing member 13 separates away from the bearing surface 3 of the guide 2, and a temporary gap 10' is formed between the opposing surface 13a and the bearing surface 3. The temporary gap 10' is set to be twice as great as the designed target bearing gap 10 (FIG. 4) of the air bearing structure. Upon measuring in advance the pressure of compressed air that is supplied, the size of the temporary gap 10', which depends on the pressure of compressed air, can, thereafter, be reproduced without the need of taking a measurement. The other opposing member 14 that is contacting to the guide 2 in this state due to the attractive force of the magnet 8 is firmly fixed to the pair of upper and lower opposing members 15 and 16 by using bolts 30.

Figure 4:
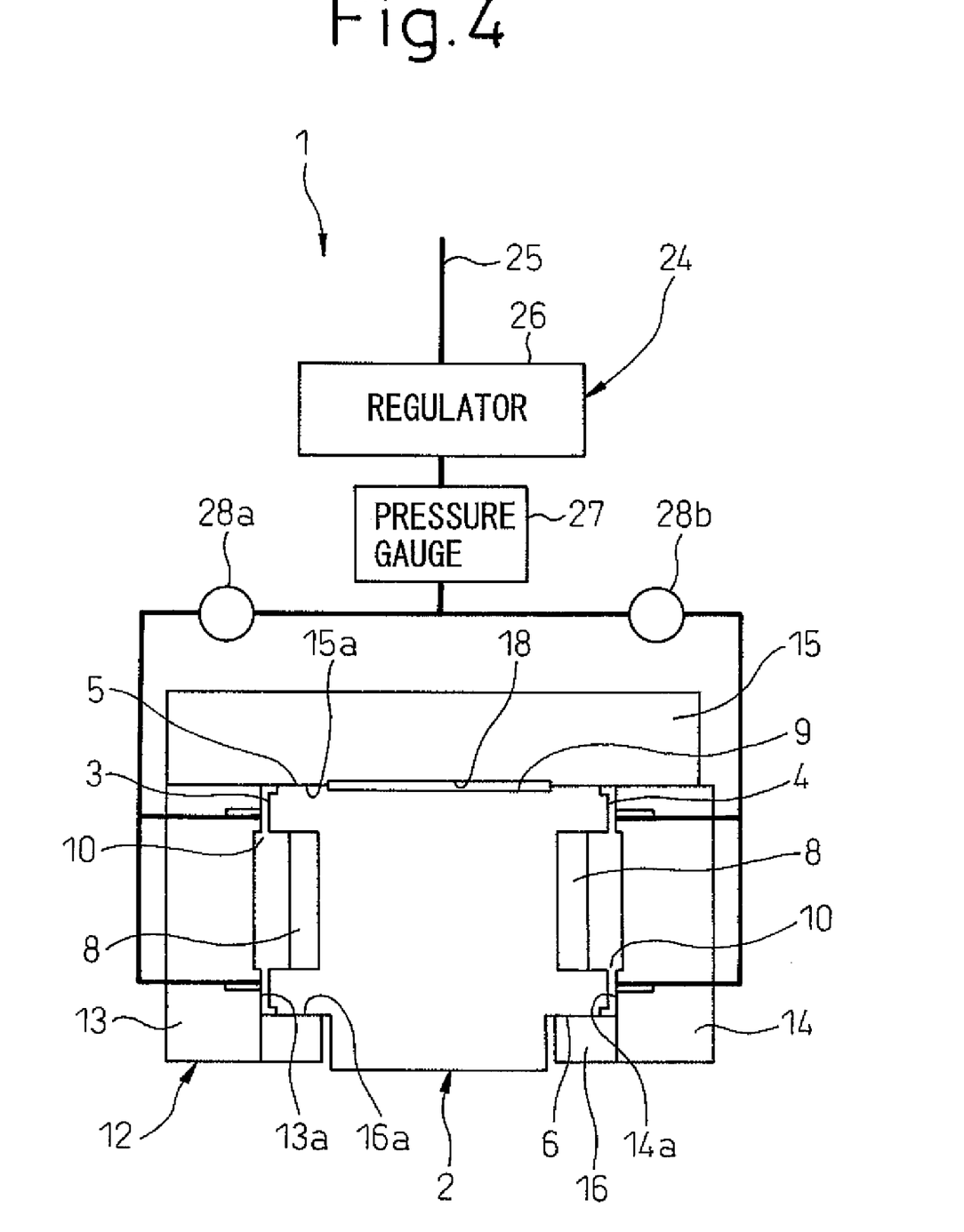
FIG. 4 is a sectional view similarly illustrating the method of assembling the air bearing, and shows a state where two valves are opened to pass compressed air.

Referring next to FIG. 4, compressed air of a suitable pressure is supplied to between the opposing surfaces 13a, 14a of the opposing members 13, 14 and the bearing surfaces 3, 4 of the guide 2 through the flow paths 19 and 20 in the pair of opposing members 13, 14 to easily form the designed target bearing gaps 10 on both the right and left sides of the guide 2.

Next, the air bearing and the method of assembling the air bearing according to a second embodiment of the invention will be described with reference to FIGS. 5 to 7. The air bearing (FIG. 7) 1A of this embodiment forms the same bearing gaps 10 between the guide 2 and the pair of opposing members 15, 16 in the up-and-down direction of the guide 2, making a difference from the air bearing (FIG. 1) 1 of the first embodiment that forms the same bearing gaps 10 between the guide 2 and the pair of opposing members 13, 14 in the right-and-left direction of the guide 2. Constituent portions overlapping between the air bearing 1A of this embodiment and the air bearing 1 of the first embodiment are denoted by the same reference numerals, but their description is not repeated.

Figure 5:
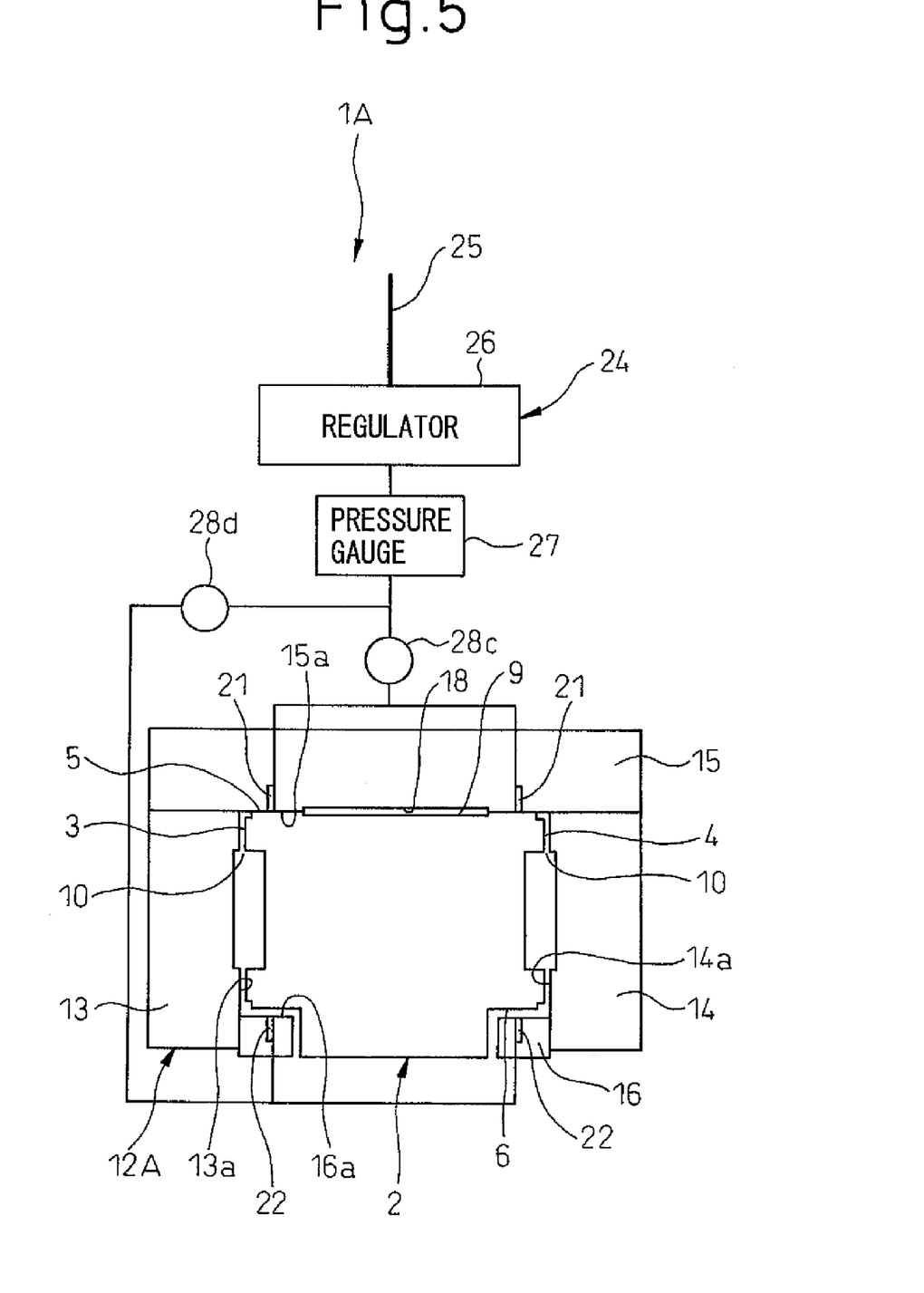
FIG. 5 is a sectional view illustrating the method of assembling the air bearing according to a second embodiment of the present invention, and shows a state where compressed air is shut off by a regulator.

Referring to FIG. 5, gaps have been formed in advance on both sides of the guide 2 in the right-and-left direction. The pair of up and down opposing members 15 and 16 have flow paths 21 and 22 formed therein to supply compressed air to the guide 2. The regulator 26 and the pressure gauge 27 are arranged on the way before compressed air is supplied to the opposing members 15, 16, and compressed air is supplied to each of the opposing members 15 and 16 independently or is shut off, like those of the first embodiment.

The pair of upper and lower opposing members 15 and 16 are coupled to the pair of right and left opposing members 13 and 14 by using bolts 30 (FIG. 1). When the upper and lower opposing members 15 and 16 are tentatively fixed, i.e., when the bolts 30 stay loosened, the opposing members 15 and 16 are allowed to move up and down by an amount of play between the externally threaded portions of the bolts 30 and the internally threaded portions, and the opposing gap can be finely adjusted.

FIG. 5 illustrates a state where compressed air is shut off by the regulator 26. Of the pair of upper and lower opposing members 15 and 16, the upper opposing member 15 is firmly fixed by bolts 30 to the right and left opposing members 13 and 14 which are the coupling members, and the lower opposing member 16 is tentatively fixed to the right and left opposing members 13 and 14. That is, the lower opposing member 16 is temporarily fixed in a state where the bolts 30 stay loosened, and is allowed to move up and down by an amount corresponding to a play between the externally threaded portions of the bolts 30 and the internally threaded portions of the opposing members 13 and 14.

The upper opposing member 15 is closely contacting to the bearing surface 5 of the guide 2 due to gravity. The lower opposing member 16 is in a tentatively fixed state, i.e., is in a state where the bolts 30 are loosened and, therefore, is separated away downward due to gravity by an amount of play between the externally threaded portions of the bolts 30 and the internally threaded portions of the opposing members 13 and 14.

Figure 6:
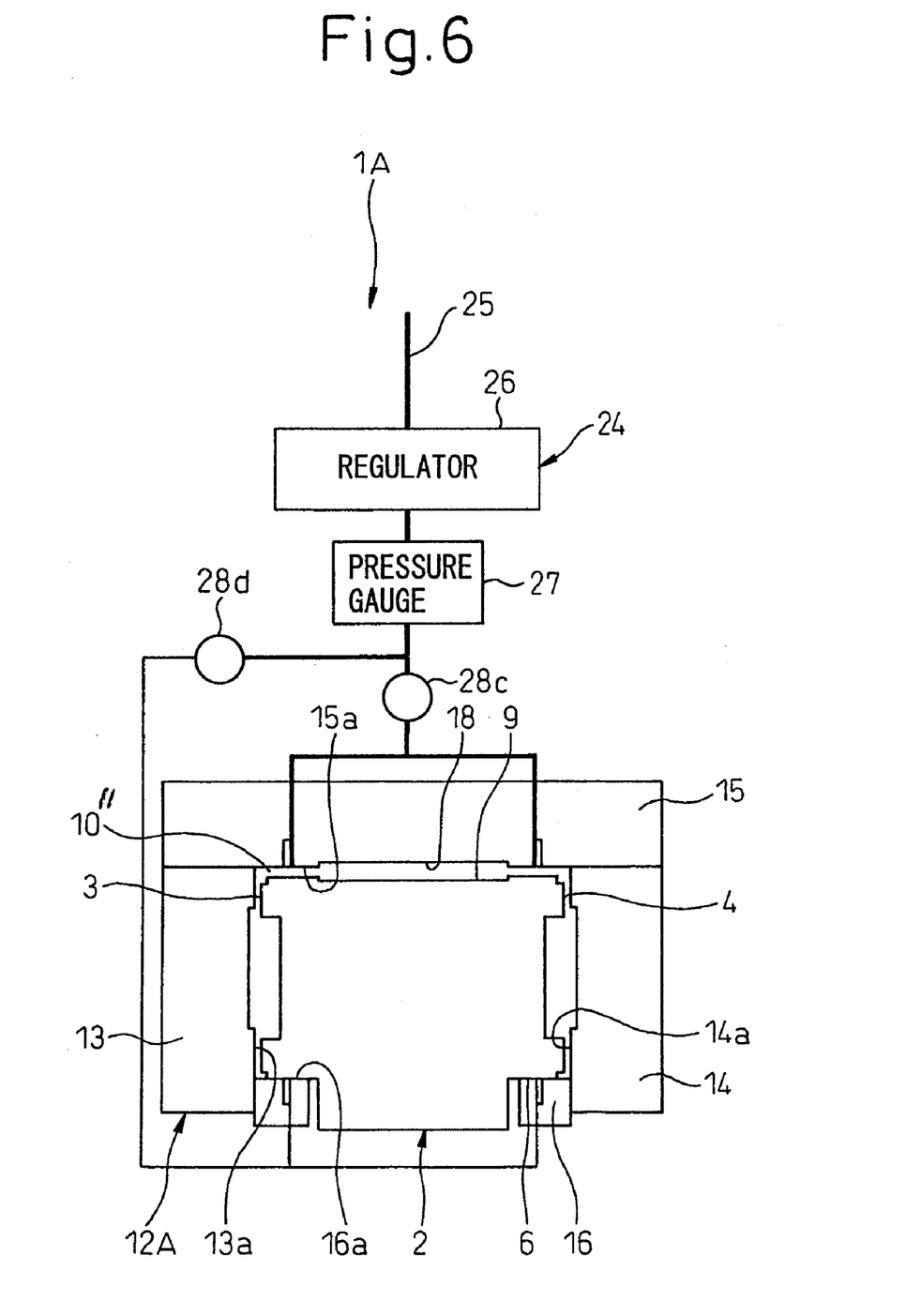
FIG. 6 is a sectional view similarly illustrating the method of assembling the air bearing, and shows a state where one valve is opened and the other valve is closed.

In this state as shown in FIG. 6, if compressed air is supplied to the upper opposing member 15, the upper opposing member 15 moves upward overcoming the gravity due to the internal pressure of compressed air, and a temporary gap 10" is formed between the upper opposing member 15 and the guide 2 in a state where the lower opposing member 16 and the guide 2 are closely contacted together. The size of the temporary gap 10" varies depending upon the pressure of compressed air, and can be reproduced any number of times upon examining, in advance, a relationship between the size of the temporary gap 10" and the pressure. The pressure of compressed air is so adjusted that the temporary gap 10" becomes twice as great as the designed target bearing gap 10 (FIG. 7) of the air bearing structure. After the temporary gap 10" is adjusted, the lower opposing member 16 is firmly fixed to the pair of right and left opposing members 13 and 14 which serve as coupling members.

Figure 7:
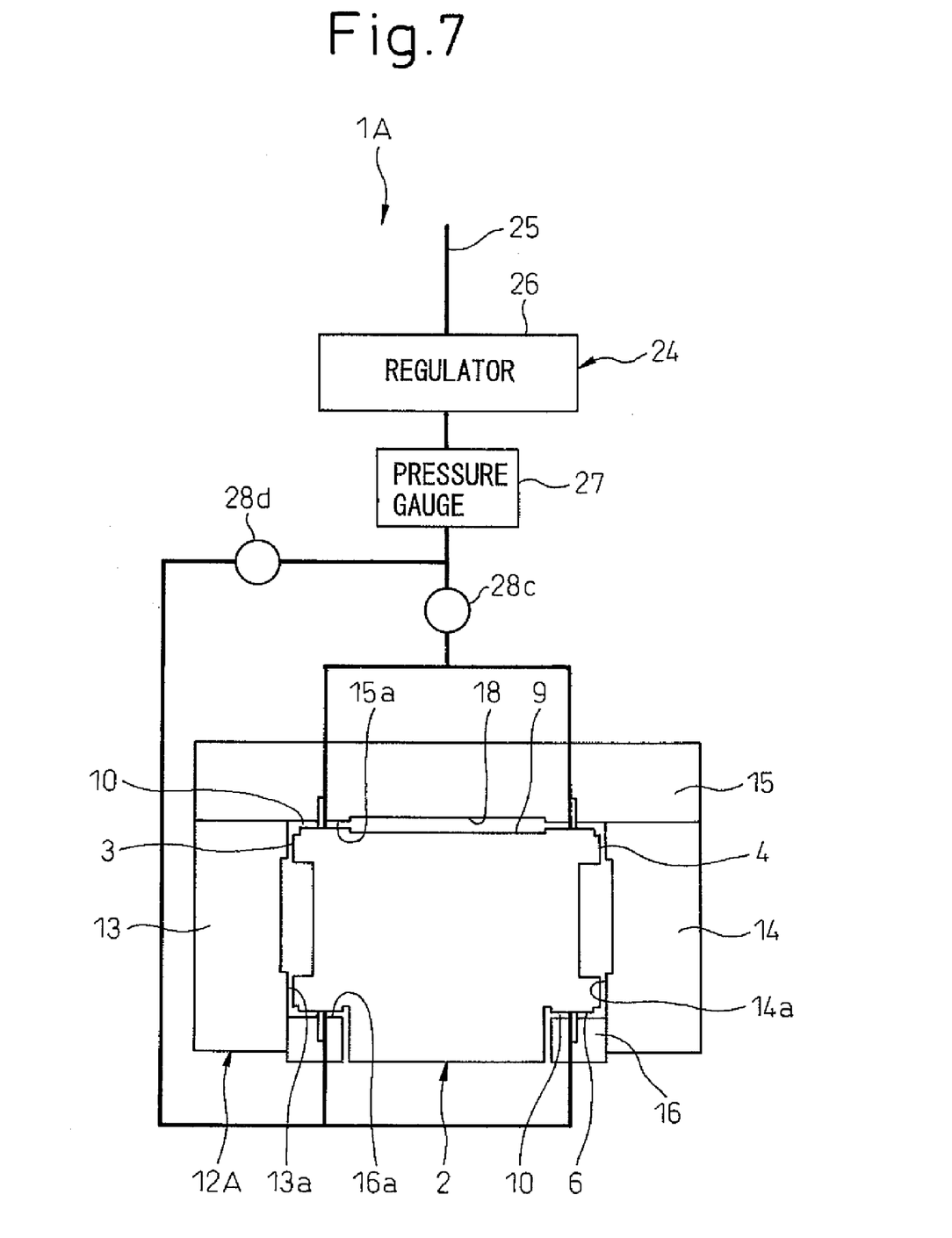
FIG. 7 is a sectional view similarly illustrating the method of assembling the air bearing, and shows a state where two valves are opened to pass compressed air.

Referring to FIG. 7, compressed air of a predetermined pressure is supplied to between the pair of upper and lower opposing members 15 and 16 to thereby form designed target bearing gaps 10 between the guide 2 and the opposing members 15, 16 in the up-and-down direction of the guide 2.

The invention is in no way limited to the above embodiments only and can be put into practice being modified in a variety of ways without departing from the gist of the invention. For example, the methods of assembling the air bearing of the first embodiment and of the second embodiment may be combined together to form the designed target bearing gaps 10 in two directions of the guide 2 at right angles with each other. Or, in the first embodiment, the pair of right and left opposing members 13 and 14 may be provided with drive coils that form magnetic fields in cooperation with the magnets 8, so that the air bearing 1 works as a linear motor of a low drive resistance.

While the invention has been described with reference to specific embodiments chosen for purpose of illustration, it should be apparent that numerous modifications could be made thereto, by those skilled in the art, without departing from the basic concept and scope of the invention.

The invention claimed is:

1. A method of assembling an air bearing, the air bearing comprising a guide on a fixed side, and a slider having a pair of opposing members arranged on opposite sides of the guide, the slider being float-supported so as to be moveable relative to the guide, the method comprising:
    contacting a first opposing member of the pair of opposing members to the guide;
    supplying compressed air of a predetermined pressure between the first opposing member and the guide contacting each other, so as to form a temporary gap, which is twice as large as a target bearing gap, between the first opposing member and the guide;
    maintaining contact between the guide and a second opposing member of the pair of opposing members; and
    supplying compressed air of the predetermined pressure between the first opposing member and the guide as well as between the second opposing member and the guide, so as to form respective target bearing gaps between first and second opposing members and the guide, in place of the temporary gap.

2. A method of assembling an air bearing according to claim 1, during a contacting state of the first and second opposing members and the guide, further comprising maintaining the contacting state by magnetic force.

3. An air bearing comprising:
    a guide on a fixed side; and
    a slider having a pair of opposing members arranged on opposite sides of the guide, the slider being float-supported so as to be moveable relative to the guide;
    wherein the guide and the slider are assembled together by the method according to claim 1.

4. An air bearing according to claim 3, further comprising another pair of opposing members provided in a direction orthogonal to the first and second opposing members, and
    respective further target bearing gaps formed between said another pair of opposing members and the guide.

5. A linear drive unit, comprising:
    the air bearing of claim 3;
    magnets which are provided in either one of the opposing members or the guide of the air bearing, and
    drive coils which are provided in the other one of the opposing members or the guide to form a magnetic field in cooperation with the magnets.

* * * * *